United States Patent [19]
Goldstein

[11] 3,859,170
[45] Jan. 7, 1975

[54] METHOD OF PRODUCING ANTIMICROBIAL AGENT M-141 AND ITS SALTS

[75] Inventor: Alma W. Goldstein, Lake Bluff, Ill.

[73] Assignee: Abbott Laboratories, Chicago, Ill.

[22] Filed: May 20, 1960

[21] Appl. No.: 30,488

[52] U.S. Cl. .................................. 195/80, 424/116
[51] Int. Cl. ............................................ A61k 21/00
[58] Field of Search ....................... 424/116; 195/80

[56] References Cited
FOREIGN PATENTS OR APPLICATIONS
811,757   4/1959   Great Britain

OTHER PUBLICATIONS
Mann et al., J.A.C.S. Jan. 5, 1958, pp. 2714-2716.

Primary Examiner—Jerome D. Goldberg
Assistant Examiner—Daren M. Stephens
Attorney, Agent, or Firm—Robert L. Niblack; Gildo E. Fato

[57] ABSTRACT

A method of producing antimicrobial agent M-141 by cultivating the organism *Streptomyces flavopersicus* NRRL 2820 under submerged aerobic conditions. The antimicrobial agent is active against a variety of bacteria and protozoan organisms, as for example, *Eimeria tenella*.

4 Claims, 1 Drawing Figure

METHOD OF PRODUCING ANTIMICROBIAL AGENT M-141 AND ITS SALTS

This invention relates to novel compounds possessing antimicrobial properties and to a process for the preparation thereof. More particularly, the invention relates to a novel composition of matter identified herein as antimicrobial agent M-141, to a process for its production by fermentation, to a method for its recovery and concentration from crude solutions including the fermentation broths, to its purification, and to its acid-addition salts and the production thereof.

It is an object of the present invention to provide a new and useful antimicrobial agent which is active against a variety of bacteria and protozoan organisms, as for example, *Eimeria tenella*. Another object of this invention is to provide acid-addition salts of this antimicrobial agent. A further object is to provide a process for the production and recovery of my novel antimicrobial agent. Other objects and features of the invention will become apparent to those skilled in the art to which this invention pertains after reading the following specification and appended claims.

It has been found that by cultivating under controlled conditions and on suitable culture media a hitherto undescribed species of *Streptomyces*, a novel composition of matter herein identified as antimicrobial agent M-141 is obtained. The microorganism was isolated from a soil sample collected near Highland, Indiana. From a comparison with species of Streptomyces as shown in *Bergey's Manual of Determinative Bacteriology*, Seventh Edition, 1957, Williams and Wilkins Company, Baltimore, Maryland; *Actinomycetes and Their Antibiotics*, Waksman, S. A., and Lechevalier, H. A., Williams and Wilkins Co., Baltimore, Maryland, 1953; *A Guide for the Classification of Streptomyces According to Selected Groups*, Pridham, T. G., Hesseltine, C. W., and Benedict, R. G., Applied Microbiology, Vol. 6, No. 1, pp. 52-79, Jan. 1958, and *Guide to the Identification of Bacteria and Actinomycetes*, Section Pertaining to Actinomycetes, Edited by Routien, J. B., Chas. Pfizer and Company, Inc., 1957, from Krassilnikov, N. A., Academy of Science, U.S.S.R., Moscow, 1949, two species were selected as most closely resembling the novel isolate of this invention. By the characteristics of biverticillate structure and relative lack of soluble pigment among others, *Streptomyces cinnamoneus* was selected; by structure of sporulating aerial mycelium and spores as well as spore color *Streptomyces netropsis* was selected. The new isolate did not satisfy enough important taxonomic criteria to merit classifying it as identical with either of the above two organisms and has been given the name *Streptomyces flavopersicus*, Novo sp. The specific epithet is derived from the Latin flavus "of a bright yellow like gold, or as ears of corn have when ripe," and color *persicus* "of a peach color." The former aptly describes the color of substratal (reverse) mycelium of mature cultures on both organic and synthetic solid media, while the combined word refers to the light yellow peach or light yellow pink, pearl pink color of the mature spore mass on all media producing abundant sporulation. Further compounding of the specific epithet to describe the light intensity of the spore color is avoided for reasons of simplicity and euphony.

A culture of the living organism has been deposited with the Northern Utilization Research and Development Division of the Agricultural Research Service, United States Department of Agriculture at Peoria, Illinois, and has been added to its permanent collection as NRRL 2820.

The following table summarizes the similarities and differences between *Streptomyces netropsis*, *Streptomyces cinnamoneus*, and *Streptomyces flavopersicus*. The SAB reference used therein refers to a collaborative study published in mimeographed form by the Subcommittee on Taxonomy of Actinomycetes of the Society of American Bacteriologists at the Annual Meeting of the Society, St. Louis, Missouri, 1959. Data for carbohydrate utilization by *Streptomyces netropsis* and *Streptomyces cinnamoneus* were taken from this report. For the purposes of comparison in the table, data for *Streptomyces flavopersicus* on carbohydrate utilization include only the 13 sources duplicated by the Committee's collaborative study.

TABLE I

Abbreviated Comparison of S. flavopersicus, S. netropsis and S. cinnamoneus

| Character | S. flavopersicus | S. netropsis | S. cinnamoneus |
|---|---|---|---|
| Type of sporulation | Biverticillate-Retinaculum apertum | Biverticillate | Biverticillate |
| Spore chains | Canes, open loops, loose open coils, no true spirals or tight coils, medium length | Short, stiff (U.S. Patent No. 2,586,762) Spiral (Pridham, et al, Appl. Microbiol. Vol. 6, No. 1, Jan., 1958): Spiral, (2 of 10 collaborators SAB Ref.) | No spirals (Dvonch, et al, Antibiotic and Chem., Vol. 4, No. 11, Nov., 1954). Short, straight to flexuous (Photomicrograph in Duggar, et al, Ann. N.Y. Acad. Sci., Vol. 60, Art. I). |
| Spores | Cylindrical, 0.4 $\mu$ × 1.1 $\mu$ | Cylindrical, 0.65 $\mu$ × 1.30 $\mu$. | Globose 0.6 $\mu$ |
| Color of Spore Mass: | | | |
| Czapek's agar | Light yellow peach, pearl pink | Pale vinaceous fawn | Shades of pink to lavender (SAB Ref.) |
| Glucose agar | Light gray aerial (sparse spores) | White aerial | White to cinnamon |
| Glucose, Asparagine agar | Pearl pink, shell, light yellow peach | White aerial, no spores | — |
| Tomato paste, oatmeal agar | Pearl pink, shell tint to pink and light beige | Light tan, pinkish tan, flesh, to cinnamon buff (SAB Ref.) | Light pink to light purple pink, to lavender (SAB Ref.) |
| Starch agar | Flesh pink to light apricot, pearl pink to light melon yellow | White aerial | White aerial |
| Potato plug | Pearl pink | No aeriaal | Light gray to gray aerial |

TABLE I — Continued

Abbreviated Comparison of S. flavopersicus, S. netropsis and S. cinnamoneus

| Character | S. flavopersicus | S. netropsis | S. cinnamoneus |
|---|---|---|---|
| Substratal Mycelium: | | | |
| Czapek's agar | Light yellow, pastel yellow | White very pale pink, cream (SAB Ref.), Pale Olive buff (U.S. Patent No. 2,586,762) | White (5 of 9 collaborators SAB Ref.) |
| Glucose, asparagine agar | Maize, golden yellow to old gold | Brown | — |
| Glucose agar | Mustard gold | Dark brown | Light greenish yellow to dull yellowish orange |
| Tomato paste, oatmeal agar | Amber to golden brown | Dark brown, deep maroon, blackish brown (SAB Ref.) | Yellow brown to walnut brown (SAB Ref.) |
| Soluble Pigment: | | | |
| Cazpek's agar | None | None (6 of 9 collaborators SAB Ref.) | None (9 or 9 collaborators SAB Ref.) |
| Glucose, asparagine agar | None | Brown | — |
| Glucose agar | None | Brown | — |
| Tomato paste, oatmeal agar | None | Brown, deep maroon (SAB Ref.) | None (7 of 9 collaborators SAB Ref.) |
| Potato plug | Mustard tan discoloration | Medium to dark brown | None |
| Nutrient agar (Waksman's) | None | Light brown | — |
| Nitrate medium | None | Brown | — |
| Gelatin | Reddish brown | Brown | None (SAB Ref.) |
| Litmus Milk | No coagulation, peptonized, alkaline | No peptonization or hydrolysis, reaction unchanged (U.S. Patent No. 2,586,762)--coagulation, peptonization neutral to slightly acid (SAB. Ref) | Coagulated, peptonized |
| Gelatin-Plain | Liquefied | No Liquefaction (U.S. Patent No. 2,586,762) | — |
| Gelatin-Nutrient | — | Liquefied (SAB Ref.) | Liquefied |
| Starch | Hydrolyzed | Hydrolyzed | Hydrolyzed |
| Nitrate reduction | Positive | Negative | Negative |
| Hemolysis | Positive | Positive (SAB Ref.) | Positive (SAB Ref.) |
| Carbon sources: | | | |
| Utilized | D-xylose, D-glucose, D-fructose, lactose, maltose, salicin, i-inositol | D-glucose, D-fructose, i-inositol, maltose (SAB Ref.) | D-glucose, D-fructose, i-inositol, maltose (SAB Ref., and Dvonch, et al, supra). |
| Not utilized | L-arabinose, D-sorbitol, L-rhamnose, D-sucrose, D-raffinose, D-mannitol (Xylose, lactose, salicin, listed above were utilized slowly). | D-xylose, L-arabinose, L-rhamnose, D-sucrose, lactose, raffinose, D-sorbitol, D-mannitol, salicin | D-xylose, L-arabinose, L-rhamnose, sucrose, lactose, raffinose, D-sorbitol, D-mannitol, salicin. |

TAXONOMY OF STREPTOMYCES FLAVOPERSICUS, SP. NOVO

With the exception of determining the cultural characteristics and proteolytic activity in gelatin which was done at 24° C., all cultural characteristics in the standard media listed below were obtained by incubation at 28° C.

The color code references are in accordance with the *Color Harmony Manual*, Third Edition, Jacobsen, R.; Granville, W. C.; and Foss, C. E.; 1948; Container Corporation of America. All such refrences consist of one or more color names followed by parentheses including a code, such as golden yellow (2kb), corresponding to a removable plastic color chip in the manual used to determine the color of reverse mycelium on Waksman's nutrient agar after 7 days' incubation.

Unless agar slant, potato wedge, or broth is specified cultural characteristics were determined from growth on the surface of 20.0 ml. of agar medium in standard 100 mm. Petri plates. The agar surface was inoculated in such a manner as to provide a band of confluent growth approximately 1.0 cm. wide on one side of the plate with more or less isolated colonies over the remainder of the agar surface. Where colonoy diameters are given these colonies were well isolated or were usually removed more than 1.0 cm. from other colonies.

WAKSMAN'S NUTRIENT AGAR 3 days — abundant growth, aerial white (a), substratal (reverse) mycelium pastel yellow (1½ hb), no soluble pigment. Isolated colonies are convex, edges entire, moderate aerial in central raised portion, diameter 3.0 mm.

7 days — aerial mycelium in confluent growth streak oyster white (b) to light gray (c) substratum between maize (2hb) and golden yellow (2kg), no soluble pigment, growth depressed into agar surface. A few colonies are characterized by one diametric fissure or depression, otherwise growth surface is unwrinkled.

15 days — aerial mycelium as day 7, substratum now mustard gold, old gold (2ne), no soluble pigment, isolated colonies characterized by slightly raised centers and abundant light gray (c) aerial, no spores, wrinkling of colony surfaces confined to an occasional diametric and rare additional radial fissure.

21 days — aerial mycelium light gray (c), sporulation virtually absent, substratum mustard gold (2pg) to mustard brown (2pi). A light feathery outgrowth extends over surface of agar 1 to 2 mm. from edges of isolated colonies 5.5 to 7.0 mm. in diameter.

GLUCOSE AGAR

Growth characteristics essentially parallel those of Waksman's nutrient agar. Aerial mycelium light gray (c), substratal (reverse) mycelium between mustard gold, old gold (2ne), and mustard gold (2pg), no soluble pigment, no colony wrinkling (diametric or radial fissuring) through 21 days of incubation.

CARVAJAL'S OATMEAL AGAR 3 days — abundant growth, aerial mycelium light gray (c), substratum pale yellow (1ca), no soluble pigment. Isolated colonies low convex with raised central portion. Aerial of isolated colonies limited chiefly to blunt central papillae. A discernible zone of partial clearing of opacity of the medium shows adjacent to growth, for example, 8.0 mm. clearing around a 3.0 mm. colony.

7 days — abundantly sporulating aerial mycelium shell, pearl pink (3ca), substratum cream (1½ ca), no soluble pigment. Secondary growth extends flatly over agar surface from dense primary colony edge to a serrate outer edge.

15 days — heavily sporulated aerial mycelium has a fluffy appearance, is pearl pink, shell (3ca) to light melon yellow (3ea), substratum bamboo, chamois (2gc), no diffusible pigment (or change in color of surrounding medium). Moderately isolated colonies extend flatly to 7.0 mm. diameter from a central 3.0 mm. convex portion.

21 days — en masse the aerial mycelium is between pearl pink, shell (3ca) and light melon yellow (3ea). Raised tufts of flesh pink, pearl pink, shell pink (4ca) appear throughout confluent growth streak. Substratal (reverse) mycelium center of confluent growth area is bamboo, chamois (2gc), at edge of streak and center of isolated colonies substratum is light mustard tan (2ie) to mustard tan (2lg). Isolated colonies spread flatly to 7.0 mm. of unwrinkled surface. No soluble pigment has developed.

CZAPEK'S SOLUTION WITH DEXTROSE, AGAR 3 days — poor faint, filmy, non-aerial growth in streak with few pinpoint isolated colonies.

7 days — white (a) aerial mycelium moderate to abundant in confluent growth streak and covering convex 2.0 mm. isolated colonies, substratum cream (1½ ca), no soluble pigment.

15 days — aerial white (a) to light pinkish tint, substratum bamboo buff, straw, wheat (2fb), no soluble pigment. Isolated colonies with deeply convex 3.0 mm. centers spreading to 4.0 mm. slightly dentate edges, growth surfaces unwrinkled.

21 days — aerial mycelium oyster white (b) to slight pink, substratum light yellow, pastel yellow, sunlight yellow (1½ ea), no soluble pigment, growth surfaces not wrinkled, 3.0 to 4.0 mm. isolated colonies deeply convex, full aerial, with slightly spreading irregular outgrowths from edges of some colonies.

DEXTROSE ASPARAGINE AGAR 3 days — moderate growth, moderate white (a) to light gray (c) aerial, substratum cream (1½ ca), no soluble pigment, convex isolated colonies 1.0 mm. diameter.

7 days — good growth, abundant white (a) to light gray (c) aerial, substratum cream (1½ ca) to light yellow, pastel yellow, sunlight yellow (1½ ea). Isolated colonies deeply convex, 3.5 mm., with slight irregular feathery outgrowth from edge.

15 days — abundantly sporulating aerial pearl pink, shell (3ca), substratum center of confluent growth streak bamboo, buff, straw, wheat (2fb), of isolated colonies maize (2hb) to golden yellow (2kb). Deeply convex 3.0 mm. colonies have irregular flatly extending growth over agar surface to 7.0 mm. diameter. No soluble pigment.

21 days — aerial shell, pearl pink (3ca) with occasional tufts of oyster white (b), substratum center of confluent growth streak bamboo, buff, straw, wheat (2fb), substratum of center of isolated colonies mustard, old gold (2le), no soluble pigment. An arborescent flat outgrowth extends over surface of agar from convex portion of isolated colonies fofllowed by 2.0 to 3.0 mm. of light feathery subsurface growth. Growth surfaces are not wrinkled.

GLYCEROL-ASPARAGINE AGAR

Mycelial growth is good in this medium but sporulation is sparse to moderate even by day 21. For comparison with dextrose asparagine agar the following characteristics at 15 and 21 days of incubation only are given.

15 days — aerial light gray (c) with scattered tufts of oyster white (b) in confluent growth streak, substratum light yellow, pastel yellow, sunlight yellow (1½ ea) to dusty yellow (1½ gc), no soluble pigment.

21 days — aerial oyster white (b) to light gray (c) with occasional tufts of sparse to moderately sporulating aerial very light pink, substratum of center of confluent growth streak light yellow, pastel yellow, sunlight yellow (1½ ea), substratum of center of isolated colonies and edge of streak mustard gold, old gold (2le), no soluble pigment. Colony morphology as in dextrose-asparagine agar.

CALCIUM MALATE AGAR 3 days — moderate growth, sparse to moderate aerial in streak and center of 0.5 mm. flat isolated colonies, no soluble pigment, no visible digestion (clearing) of malate.

7 days — abundant white (a) aerial in streak and on small low convex colonies, no soluble pigment, no visible digestion.

15 days — aerial mycelium white (a) with occasional tufts of very light brown aerial in less crowded areas, no soluble pigment, no digestion.

21 days — same as day 15.

YEAST EXTRACT, DEXTROSE, $NH_4NO_3$, CORN STARCH AGAR 3 days — abundant growth, moderate aerial in center of convex isolated colonies, starch hydrolysis 7.0 mm. zone around 3.0 mm. colony and 5.0 mm. from edge of confluent growth streak, no soluble pigment.

7 days — aerial on edge of streak and on isolated colonies heavily sporulated pearl pink, shell (3ca), substratum cream (1½ ea), no soluble pigment, hydrolysis (clearing) marked.

15 days — aerial mycelium and sporulation as day 7, substratum putty (1½ ec). Isolated 4.0 mm. colonies deeply convex with slight central depression, and additional slight feathery non-aerial extends flatly over agar surface from primary colony base.

21 days — few tufts of sporulated aerial now appear in central portion of confluent growth streak. Aerial of heavily sporulated streak edge and isolated colonies between pearl pink, shell (3ca) and light melon yellow (3ea), substratum (reverse) these areas mustard, old gold (2le), substratum center of streak cream (1½ ca). Convex portion of isolated colonies 4.0 mm. then extending flatly over and beneath surface to 9.0 mm. Hydrolysis almost complete over entire plate. No soluble pigment.

INORGANIC SALTS, SOLUBLE STARCH AGAR 3 days — moderate flat colorless growth, rare tufts of aerial mycelium in confluence growth streak, no soluble pigment, no visible hydrolysis.

7 days — abundant aerial, good sporulation, light pearl pink, shell (3ca), substratum between yellow tint (1ba) and parchment (1cb), no soluble pigment, no visible hydrolysis.

15 days — sporulated aerial mycelium between flesh pink, pearl pink, shell pink, tearose (4ca) and light apricot (4ea), no visible hydrolysis (clearing).

21 days — same as day 15.

TRYPTOSE BLOOD AGAR 3 days — abundant growth, no aerial, no soluble pigment (discoloration) hemolysis questionable. Isolated colonies low convex, entire edges, dully glistening surface.

7 days — no aerial, hemolysis 6.0 mm. from edge of confluent growth streak, no detectable soluble pigment, intact erythrocytes browned, 2.0 mm. isolated colonies with dull sheen and small central papillae.

15 to 21 days — same as day 7, no increase in zone of hemolysis.

YEAST EXTRACT, MALT EXTRACT AGAR 3 days — abundant growth, abundant white (a) to oyster white (b) aerial, substratum light pastel yellow (1½ fb), no soluble pigment. Well-isolated colonies 4.0 mm. low convex with abundant aerial except narrow non-aerial margin.

7 days — aerial of confluent growth streak has slight pink tint, substratum between bamboo, buff, straw, wheat (2fb) in center of streak to maize (2hb) at edge, no soluble pigment. Isolated colonies 6.0 mm.

15 days — sporulation moderate, aerial pearl pink, shell (3ca) in more heavily sporulating areas, sporulating aerial fluffy, raised above sparsely or non-sporulating aerial, substratum honey gold, light gold (2ic), 7.0 mm. isolated colonies with full aerial and slight 2.0 mm. central depression, no wrinkling.

21 days — aerial between pearl pink, shell (3ca) and bisque, light beige (3ec), substratum of center of streak (2ec) and of less crowded colonies mustard gold (2pg), no soluble pigment. Colony morphology same as day 15.

TOMATO PASTE OATMEAL AGAR 3 days — abundant growth and white (a) aerial mycelium, numerous raised tufts of fluffy aerial in confluent growth streak, pale yellow substratum, no soluble pigment (no change in color of medium). Well-isolated colonies 3.0 mm., convex, entire edges, with aerial in central raised portion.

7 days — abundant sporulating mycelium pearl, shell tint (3ba), substratum between maize (2hb) and golden yellow (2kb), no soluble pigment. Clearing in opacity of medium visible adjacent to growth. Well-isolated colonies deeply convex, 5.0 mm. diameter, full sporulating aerial.

15 days — aerial between pearl pink, shell (3ca) and bisque, light beige (3ec), substratum amber, topaz (3pe) to golden brown (3pg), subsurface mycelium extends deeply into agar beyond edge of surface growth. Well-isolated colonies 6.0 mm., convex, smooth, fluffy fully sporulating aerial.

21 days — fluffy sporulated aerial bisque, light beige, (3ec), substratum center of streak amber, topaz (3pe), substratum edge of streak and center of isolated colonies golden brown (3pg), no soluble pigment. Colony morphology same as day 15, extent of subsurface growth 3.0 mm. beyond edge of streak and 6.0 mm. isolated colonies.

PEPTONE AGAR 3 days — good growth, no aerial, no soluble pigment, substratum (reverse) pale yellow (1ca). Isolated colonies 2.0 mm. diameter, low convex, dully glistening.

7 days — no aerial, no soluble pigment, substratum parchment (1½ db).

15 days — no aerial, no soluble pigment. Isolated colonies 2.5 mm. convex, with slight flat periphery.

21 days — no aerial, no soluble pigment, surface and substratal (reverse) mycelium pale yellow (1ca).

GLYCEROL, GLYCINE AGAR 3 days — poor to fair flat, filmy, colorless growth, no aerial, no soluble pigment. Isolated colonies 0.5 to 1.0 mm.

7 days — good growth, full white (a) aerial in confluent growth streak, substratum pale yellow (1ca), no soluble pigments. Well-isolated colonies 2.5 mm. diameter, low convex, slightly feathery edges, few colonies have little or no aerial.

15 days — aerial white (a), substratum light yellow, pastel yellow, sunlight yellow (1½ ea), no soluble pigment.

21 days — aerial white (a) to slight gray, no spores, substratum same as day 15, no soluble pigment. Surface of confluent growth streak lightly wrinkled, coinciding with checkered appearance of reverse mycelium.

NITRATE REDUCTION AGAR SLANTS 4 days — poor growth, growth respread over surface with loop.

12 days — good growth, abundant white (a) aerial, test for nitrite negative.

18 days — nitrite negative.

25 days — test for nitrite faintly positive.

GELATIN PLUG 3 days — moderate growth located chiefly at bottom of 4.0 mm. liquefied portion. Few non-aerial colonies at juncture of surface with wall of tube, mycelium reddish brown.

7 days — 1 centimeter liquefaction, good subsurface growth, soluble pigment dark red brown in liquid portion above growth.

15 days — soluble pigment extends to 6.0 mm. below surface, abundant mycelium below pigment layer, surface growth has dropped to bottom of liquid medium.

21 days — red brown soluble pigment to 1.0 cm. below surface, 4.0 mm. additional occupied by mycelium, liquefaction marked, remainder of plug brownish green.

POTATO WEDGE 3 days — abundant non-aerial light yellow growth, potato discolored light tan.

7 days — no aerial, pale yellow (1ca) growth, potato in vicinity of growth between natural string (2dc) and convert gray (3fe).

15 days — light gray (c) aerial at top of slant, this portion of potato light mustard tan (2ie).

21 days — aerial at top of slant pearl pink, shell (3ca), non-aerial colonies at butt light yellow, reverse of potato mustard tan (2lg).

28 days — fluffy light pink aerial, sporulation confirmed by microscopic examination.

LITMUS MILK 3 days — slight growth at juncture of tube and liquid surface, no visible aerial, no change in milk.

7 days — yellowish ring of growth extending 3.0 mm. above surface on sides of tube, no pellicle, no coagulation, slight peptonization.

15 days — ring of growth 6.0 mm., complete peptonization, pH 8.0.

Assimilation of carbon from various sources by *Streptomyces flavopersicus* is shown in Table 2. Presence or absence of sporulation, character of reverse mycelium, and presence or absence of soluble pigment was also noted in this basal medium varied by carbon substrate added. Spores were profuse in all cases of rapid growth by the seventh or fifteenth day of incubation and as early or by day 21 in most instances of moderate growth. Uniformly the color of the sporulating mycelium agreed in color with the preceding media, i.e., very light peach color or light yellow-cream tinted with pink. This color noted in the color manual used as pearl pink, shell (3ca) or as a darker shade in a few aging spore masses as flesh pink (4ca) to light apricot (4ea). The substratal (reverse) mycelium was the brighter shades of yellow varying in intensity with incubation time from very light yellow (pastel yellow) to golden yellow. No soluble pigment was produced.

TABLE 2

Utilization of Carbon Sources by Streptomyces flavopersicus

| | Source | Utilization | Rate of Growth |
|---|---|---|---|
| Pentoses | Xylose | + | Slow |
| | Arabinose | − | − |
| | Rhamnose | − | − |
| Hexoses | Glucose | + | Rapid |
| | Galactose | + | Moderate |
| | Mannose | + | Rapid |
| Ketoses | Fructose | + | Rapid |
| | Sorbose | − | − |
| Di-Saccharides | Sucrose | − | − |
| | Lactose | + | Slow |
| | Maltose | + | Rapid |
| | Cellobiose | + | Moderate |
| Tri-Saccharide | Raffinose | − | − |
| Poly-Saccharide | Soluble Starch | + | Rapid |
| | Cellulose | − | − |
| Glucoside | Salicin | + | Slow |
| Alcohols | Glycerol | + | Rapid |
| | Mannitol | + | − |
| | Dulcitol | + | Moderate |
| | Inositol | + | Moderate |

TABLE 2-Continued

Utilization of Carbon Sources by Streptomyces flavopersicus

| | Source | Utilization | Rate of Growth |
|---|---|---|---|
| | Sorbitol | − | − |
| Acids | Sodium Citrate | + | Rapid |
| | Sodium Lactate | + | Slow |
| | Sodium Succinate | + | Moderate |
| | Sodium Acetate | + | Moderate |
| | Sodium Potassium Tartrate | − | − |
| Control | No Carbon Source | − | − |

MORPHOLOGY OF SPORULATING MYCELIUM

LIGHT MICROSCOPY

The morphology of spore chains and spores was consistent in all media in which spores were produced, both organic and synthetic. The following description is from observation and photomicrographs of growth on the basal medium of Pridham and Gottlieb with dulcitol as the carbon substrate.

The branching structure of sporulating mycelium is biverticillate, spore chains being produced in tufted whorls at the ends of short primary branches which in turn arise as verticils or whorls from a common locus around the aerial mycelial filament. These primary branches number usually two, three, or four. Single branches bearing tufts of spores were not observed and more than four were often suspected. Spore chains in the tufts are numerous, less than four chains per tuft were not observed. The individual spore chains of medium length are found in hooks or canes, open loop and loose coils. Tight coils and true corkscrew spiralling were not observed. The spores are cylindrical with squarely blunt ends, rarely ovoid, never spherical. Typically the spores appeared to be two to three times as long as thick, with straight sides. Actual dimensions were determined by electron microscopy at 8,500; 14,000; and 28,000 diameters.

ELECTRON MICROSCOPY

Electron microscopy confirmed the features noted above, namely, biverticillate morphology of sporulating aerial mycelium, existence of spore chains in open loops and loose coils, and the straight sided cylindrical spore morphology. Visual study and electron micrographs were made from growth on inorganic salts, soluble starch agar and from a duplicate of the plate used for recording light microscopic studies above.

From metal casts and other preparations used for electron micrographs the following additional features were determined. Spores are smooth type. Although slight surface irregularities show in shadowed casts of spores at 28,000 diameters, the spore surface is free from spines, ridges, or convolutions. The average spore size is 0.4 by 1.1 microns, range 0.3 to 0.5 microns in width by 0.9 to 1.3 microns in length.

Main filaments of aerial mycelium are 0.3 to 0.4 microns thickening to 0.5 microns immediately adjacent to the point of verticillate branching. Branches of the verticils approximate the size of the principal mycelium, the bases being thicker than the distal filament.

The present invention as previously stated also embraces a process for growing *Streptomyces flavopersicus* under controlled conditions which include a temperature of 24° to 32°C., submerged fermentation with suitable agitation and aeration using a medium consisting of a carbon source such as glucose, glycerol, transesterified vegetable oils, or combination of these; a source of organic nitrogen such as soybean meal; a source of growth substances and minerals such as distillers solubles; mineral salts such as sodium chloride; an insoluble buffering agent to prevent the accumulation of acid such as calcium carbonate, and a non-toxic defoaming agent such as trans-esterified vegetable oils or soybean oil plus methylpolysiloxane antifoam. When the growth of the organism has produced a satisfactory amount of antibiotic substance as indicated by assay with the *Escherichia coli* zone of inhibition method, the culture is filtered and the antimicrobial agent recovered from the filtrate. The major portion of the active material is in the liquid and relatively little in the mycelium of the filter cake. A process involving the use of an ion exchange resin will remove the activity from the filtrate. The antimicrobial substance is readily obtained as the crystalline sulfate or hydrochloride salt. The procedures involved are more fully described and illustrated in the examples. A specific substance thus obtained possesses unique and valuable properties. It has characteristics which distinguish it from known and previously described antimicrobial substances.

Inoculum suitable for use in shaken flasks can be obtained by using the growth from tryptone agar slants. This medium can also be used to maintain by transfer from slant to slant, suitable viable cultures which produce the antimicrobial substance. However, in general practice, the maintenance of the *Streptomyces flavopersicus* in soil or under lyophilization has proven a more dependable procedure. The growth on agar slants is used to inoculate shaken flasks which in turn may be used to inoculate fermentors of the size used for research purposes.

An alternate procedure is to use the shaken flasks to inoculate suitable metal vessels containing an appropriate medium which is used to inoculate pilot scale fermentors or the seed tanks for the larger equipment. In general, the production of the antimicrobial agent in fermentors ranging from 23 liters to 2,000 liters in size reaches its maximum in 5 days. There is no advantage in extending the fermentation beyond the 5 days. For purposes of producing inoculum, good growth of the culture is achieved in 24 hours. Aerobic conditions are maintained in the fermentors by forcing sterile air through a dispersing device in the bottom of the fermentor. The rate of air forced into the culture medium varies somewhat with the size and shape of the fermentation vessel. An aeration rate of 4/5 volume to 1 volume of air per volume of culture per minute is satisfactory. Foaming of the culture medium during fermentation may be controlled with non-toxic vegetable oils, such as trans-esterified vegetable oils, which also serve as a carbon source, or a methylpolysiloxane antifoam dissolved in a vegetable oil such as soybeam oil. Throughout the fermentation period, the culture medium is vigorously agitated by mechanical means. However, in one step of inoculum preparation where the yield of antimicrobial substance in the inoculum itself is not of major importance, sufficient agitation for satisfactory growth is accomplished by bubbling air through the liquid. In contrast, when the yield of the antimicrobial substance is important, agitation is accomplished by stirring devices which are part of the fermentation units. The degree of agitation is dependent upon the design of the varied sized fermentation vessels since it is well understood that pilot and commercial sized fermentation tanks are designed for general usage rather than for a specific fermentation process. The organism *Streptomyces flavopersicus* is able to produce the desired antimicrobial agent in satisfactory amounts in a limited variety of culture media, over a temperature range of at least 24° to 32° C., and it is apparently not necessary to maintain an exact aeration or a precise amount of mechanical agitation.

The following examples illustrate the formation, recovery, concentration, purification, and identification of antimicrobial agent M-141 and acid-addition salts thereof. These examples are merely illustrative in nature and are not to be construed as limiting.

EXAMPLE I

Production in 23-Liter Fermentors with a Soybeam Meal-Glucose-Sodium Chloride Medium To a 500 ml. Erlenmeyer flask is added 150 ml. of a seed medium containing the following ingredients in the concentrations given:

|  | Grams Per Liter |
|---|---|
| Glucose monohydrate | 15 |
| Soya-fluff flour (finely ground defatted soybean meal) | 15 |
| Sodium chloride | 5 |
| Calcium carbonate | 1 |

The flask and its contents are sterilized by autoclaving for a period of 25 to 30 minutes at a temperature of 121° C. After cooling, the flask is inoculated with a section from the surface of a tryptone agar slant on which *Streptomyces flavopersicus* has been growing for at least 6 days. The inoculated flask is agitated at 28° C. on a rotary shaker having a stroke of 2¼ inches and operating at about 230 R.P.M. for a period of 48 hours. A second passage of the seed culture is prepared by using the above culture to inoculate additional flasks prepared and sterilized as above. Each flask is inoculated with about 3 ml. of the 48-hour culture. The seed flasks are incubated and agitated as just described for 48 hours.

In a fermentation tank of 23-liter capacity is placed 12 liters of a fermentation medium having the following composition:

|  | Grams Per Liter |
|---|---|
| Glucose monohydrate | 25 |
| Soybean meal | 20 |
| Calcium carbonate | 1 |
| Sodium chloride | 5 |
| Soybean oil | 5 |
| Methylpolysiloxane antifoam | 1 |

The fermentor and its contents are sterilized by autoclaving for 75 minutes at 121° C. After cooling, the fermentor is inoculated aseptically with the contents of three of the above-described flasks of second passage seed culture. The culture is grown in the fementor at 28° C. for 5 days during which time the broth is stirred mechanically and sterile air is passed into the bottom of the tank at the rate of about 0.8 volume of air per volume of broth per minute. The maximum biological activity is reached after about 5 days. The presence of the antimicrobial agent in the fermented medium is indicated by an inhibition zone of 17 mm. surrounding a paper disc of 13 mm. diameter saturated with the clarified culture liquid and placed on agar seeded with *Escherichia coli*. Under the same conditions, a growth inhibition zone of 18 mm. is produced by a chloramphenicol solution of concentration 0.08 mg./ml.

EXAMPLE 2

Production in 23-Liter Fermentors with a Soybean Meal-Glucose-Distillers Solubles-Glycerol Medium In a fermentation tank of 23-liter capacity is placed 12 liters of a fermentation medium having the following composition:

|   | Grams Per Liter |
|---|---|
| Glucose monohydrate | 15 |
| Soybean meal | 15 |
| Sodium chloride | 5 |
| Dried molasses distillers solubles | 5 |
| Glycerol | 2.5 |
| Calcium carbonate | 1 |
| Soybean oil | 5 |
| Methylpolysiloxane antifoam | 1 |

The fermentor and its contents are sterilized at 121° C. for 90 minutes. After cooling, the fermentor is inoculated aseptically with the contents of three seed flasks prepared as in Example I. The culture is stirred and aerated at 28° C. for 5 days as in Example I. The presence of the antimicrobial substance in the fermentation liquid is demonstrated by an inhibition zone surrounding a paper disc on agar seeded with *Escherichia coli*. The diameter of the zone of inhibition around a disc of 13 mm. diameter is 17 to 18 mm. under conditions such that a solution of chloramphenicol of concentration 0.08 mg./ml. gives a zone of inhibition of 18 mm.

EXAMPLE 3

Production in 200-Liter Fermentors with a Soybean Meal-Glucose Medium

The organism, *Streptomyces flavopersicus* is grown on tryptone agar slants for 6 days at 28° C. The growth from an agar slant is suspended in a few milliliters of sterile water and two 500-ml. Erlenmeyer flasks each containing 150 ml. of the following seed medium are inoculated:

|   | Grams Per Liter |
|---|---|
| Glucose monohydrate | 15 |
| Soya-fluff flour (finely ground defatted soybean meal) | 15 |
| Sodium chloride | 5 |
| Calcium carbonate | 1 |

The flasks containing 150 ml. of this medium are sterilized by autoclaving for a period of 25 to 30 minutes at 120° C. After cooling, the flasks are inoculated with the growth from the agar culture as just described. The inoculated flasks are agitated at 28° C. for 48 hours on a rotary shaker having an eccentric of 2¼ inches and operating at about 230 R.P.M. The entire contents of these flasks are used to inoculate 10 liters of the following medium contained in a metal aerated bottle of approximately 12-liter capacity:

|   | Grams Per Liter |
|---|---|
| Glucose monohydrate | 15 |
| Soya-fluff flour | 15 |
| Sodium chloride | 5 |

-Continued

|   | Grams Per Liter |
|---|---|
| Calcium carbonate | 1 |
| Trans-esterified vegetable oils | 5 |

The metal vessel and its contents were previously sterilized for 80 minutes at 120° C. and cooled to 28° C.

The aerated bottle is incubated at 28° C. for 48 hours. Air is bubbled through the culture medium from a tube at the bottom at the rate of approximately 10 liters per minute. The entire contents of the bottle is then used to inoculate a fermentor of 200-liter capacity containing 125 liters of the following medium which has been previously sterilized at 124° C. for 45 minutes and cooled to 28° C.:

|   | Grams Per Liter |
|---|---|
| Glucose monohydrate | 25 |
| Soybean meal | 20 |
| Calcium carbonate | 1 |
| Soybean oil | 5 |
| Methylpolysiloxane antifoam | 1 |

The inoculated medium in the fermentor is maintained under vigorous agitation at a temperature of 28° C. for 5 days while aerating at a rate of one volume per volume of medium per minute. The assay on the broth supernatant following centrifugation is 400 units per ml.

EXAMPLE 4

Production in 2,000-Liter Fermentors with a Soybean-Glucose Medium

Inoculum for the seed fermentor is prepared in the aerated bottle procedure as described in Example 3. The entire contents of one of the metal culture bottles is used to inoculate a seed fermentor of 200-liter capacity containing 125 liters of the following medium which is sterilized at 124° C. for 45 minutes and cooled to 28° C.:

|   | Grams Per Liter |
|---|---|
| Glucose monohydrate | 25 |
| Soybean meal | 20 |
| Calcium carbonate | 1 |
| Trans-esterified vegetable oils | 30 |

The seed fermentor is held at 28° C. for 24 hours with vigorous mechanical agitation and aeration at the rate of one volume of air per volume of culture medium per minute. At the end of this 24-hour period the entire contents of the fermentor is used to inoculate 1,250 liters of the same medium in a fermentor with a capacity of 2,000 liters. The inoculated medium is maintained under vigorous mechanical agitation at a temperature of 28° C. for 5 days. Sterile air for aeration of the culture medium is introduced at the rate of one volume per volume of medium per minute. The assay on the broth supernatant following centrifugation is 1,000 units per ml.

EXAMPLE 5

Recovery of Antimicrobial Agent M-141 Hydrochloride from 23-Liter Fermentor Beer About 7 liters of beer produced as in Example I are filtered with suction using a filter aid to yield 5.6 liters of filtrate. The filtered beer is passed over 500 ml. of an ion exchange resin of low cross linkage (i.e., a soft, porous, resin) having carboxylic acid groups as its active groups. The resin is contained in a glass column of about 3 cm. diameter and is used in the sodium form. After the beer has gone through the column, the column is washed with water and developed with 0.25 N NCl. Fractions are collected and tested for antibacterial activity. The active fractions from the column are combined, adjusted to pH 4, and evaporated to a residue. The residue is extracted with methanol; the methanol solution is treated with sulfuric acid to precipitate most of the calcium as sulfate and then adjusted to about pH 6 with sodium hydroxide and filtered. The filtrate is evaporated to dryness and the residue is dissolved in 5 ml. of water and filtered. On adding 15 ml. of acetone to the solution, the M-141 hydrochloride is crystallized in a yield of 900 mg.

EXAMPLE 6

Recovery of Antimicrobial Agent M-141 Hydrochloride from 23-Liter Fermentor Beer About 14 liters of beer produced in two fermentors as described in Example 2 are filtered by suction using a filter aid to yield 12 liters of filtered beer. The latter is passed through a column containing about 500 ml. of an ion exchange resin of the carboxylic acid type in its sodium form. After the column is washed with water, the antimicrobial product is eluted with half-normal hydrochloric acid. The eluate solution is neutralized with sodium hydroxide and evaporated to dryness yielding a residue containing sodium and calcium chloride and the hydrochloric acid-addition salt of the desired substance. The residue is extracted several times with small portions of methanol, which leaves most of the sodium chloride behind. The methanol extracts, about 100 ml. in total volume are combined and treated with sodium sulfate to precipitate most of the calcium as calcium sulfate. The precipitate is removed by filtration and the filtrate is evaporated to dryness to yield about 1.4 grams of the crude hydrochloride salt of M-141 base.

About 350 mg. of the crude M-141 hydrochloride prepared as described above are dissolved in 5 ml. of water, stirred with 2 mg. of activated carbon to remove colored impurities, filtered, and diluted with four volumes of acetone. After a few minutes, the M-141 hydrochloride begins to crystallize in long white needles. The solution is held overnight at 5° C. to complete the crystallization. The product is separated from the supernatant by filtration and dried at room temperature to yield 260 mg. of crystals.

EXAMPLE 7

Recovery of Antimicrobial Agent M-141 Hydrochloride Using a Sulfonic Acid Exchange Resin Sixteen liters of filtered beer produced in three fermentors as in Example 2 are passed over 450 ml. of a sulfonic acid type of cation exchange resin in a glass column of 5 cm. diameter. The beer is allowed to flow through the resin by gravity; the column is washed with water and the antimicrobial substance is eluted with 2.7 liters of 5% aqueous sodium chloride. The eluate is evaporated to dryness and the residue is extracted with 100 ml. of methanol. To the methanol solution is added slowly a 20% sulfuric acid solution until no more precipitate is formed. The supernatant is neutralized with sodium hydroxide causing precipitation of sodium sulfate which is removed by filtration. The filtrate is evaporated to dryness and dissolved in 15 ml. of water. On standing overnight at room temperature, the antimicrobial substance crystallizes. The crystals are washed with a 2:1 acetone-water solution and air dried at room temperature to yield 120 mg. of the hydrochloride salt of M-141.

EXAMPLE 8

Recovery of Antimicrobial Agent M-141 Hydrochloride from 200-Liter Fermentor Beer The culture liquid from two tanks of beer produced as in Example 3 is filtered to yield 140 liters of filtered beer.

Eight liters of the sodium form of a carboxylic acid type ion exchange resin of low cross linkage is placed in a glass column of 10 cm. diameter and the filtered beer is passed over the resin at the rate of 600 ml. per minute. The resin retains virtually all of the antibacterial activity of the beer. The resin is washed with water and the active substance is recovered by passing 0.5 normal hydrochloric acid over the resin at a rate of 350 ml. per minute until a total of 40 liters has been collected in one liter fractions. The fractions are tested for antibacterial activity by the standard plate assay and the active fractions are combined, adjusted to pH 6.5, concentrated by evaporation to 950 ml., diluted with 3 liters of acetone, and held at 5° C. for 6 hours. The precipitate which forms is collected, dissolved in 500 ml. of water, stirred with 2.5 grams of activated carbon, filtered, and diluted with four volumes of acetone. On standing for several hours at room temperature and overnight at 5° C., a crystalline hydrochloride precipitates from the acetone solution. The hydrochloride product is collected by filtration, washed with 80% acetate and air dried at room temperature. Weight = 20 grams.

EXAMPLE 9

Recovery of Antimicrobial Agent M-141 Hydrochloride from 1,250-Liter Fermentations The whole cultures from three 2,000-liter fermentors produced as in Example 4 are pooled. This pool of about 3,000 liters assays 700 units per ml. A solution of ammonium oxalate is prepared by dissolving 3,840 grams of oxalic acid in 45 liters of water. The pH of this solution is adjusted to 6.0 with concentrated ammonium hydroxide. This ammonium oxalate solution and 300 pounds of a filter aid are added to the whole culture. After agitating the slurry for 30 minutes the mixture is filtered and the cake washed with an additional 150 liters of water and blown dry.

The filtrate measuring approximately 2,700 liters is passed over 280 liters of a carboxylic acid type of ion exchange resin in the sodium form. The filtrate is passed through the resin at a rate of about 20 liters per minute. Samples of the effluent which are taken every 10 to 15 minutes indicate that less than 1% of the activity is not absorbed. The resin is then backwashed with deionized water until the effluent is clear and colorless. The resin is eluted with 450 liters of 0.179 normal hydrochloric acid and this is followed by 780 liters of 0.5 normal hydrochloric acid. The eluates are collected in fractions as follows:

| Eluate No. | Volume (Liters) | Assay (Units/ml.) |
|---|---|---|
| 1 | 380 | 0 |

-Continued

| Eluate No. | Volume (Liters) | Assay (Units/ml.) |
|---|---|---|
| 2 | 140 | 0 |
| 3 | 180 | 0 |
| 4 | 190 | 637 |
| 5 | 210 | 3800 |
| 6 | 190 | 4450 |

The pH of the eluates 4, 5, and 6 are adjusted to 5.0 to 6.5 with a solution of 25% sodium hydroxide. The eluates are combined as follows and concentrated at approximately 35° C. under reduced pressure:

| Eluate No. | Volume (Liters) | Assay (Units/ml.) |
|---|---|---|
| 1 – 5 | 15.5 | 818 |
| 3 | 10 | 1550 |
| 4, 5, 6 | 43 | 37625 |

Total solids are determined on each of the combined eluates and the potency is determined.

| Concentrated Eluates | Assay (Units/mg.) |
|---|---|
| 1 – 2 | 4.8 |
| 3 | 8.2 |
| 4, 5, 6 | 94 |

As these eluates are concentrated, the active material precipitates. The precipitates from the concentrated eluates are collected on a filter with the aid of a filter aid. The filter cake which contains the major portion of the activity, is extracted three times with 7.6 liter portions of methanol. The methanol extract is concentrated under reduced pressure to 13 liters and chilled for 18 hours. The solids are removed and the filtrate is concentrated to 5 liters. Six liters of water are added to the concentrate and the total volume of the concentrate is reduced to 6 liters by distillation in vacuo. The concentrate is cooled overnight and crystals are formed. The crystals are collected by filtration, washed with acetone, and dried in a vacuum oven at 50° C. A yield of 156 grams of crystals are obtained which assay 1,070 units per mg.

The mother liquors are concentrated further to 4 liters and cooled. A second crop of crystals are obtained which yield 752 grams of material assaying 1,033 units per mg.

The two crystalline materials are combined and dissolved in 4 liters of methanol. Ten grams of activated charcoal are added to decolorize the product. The solution is filtered to remove the carbon and the filtrate concentrated in vacuo. During the concentration, 3,600 ml. of water are added while methanol is being removed by distillation. The active material crystallizes from the aqueous solution when the solution is refrigerated overnight. The crystals are collected by filtration, washed with acetone and dried in a vacuum oven at 50° C.

The motor liquors from this crystallization are retreated with 40 grams of activated charcoal and the filtrate is concentrated to 1,500 ml. A second crop of crystals are collected and processed in the same manner. A total yield of 678 grams of crystalline antimicrobial agent M-141 hydrochloride is obtained which assays 1,200 units per mg.

EXAMPLE 10

Preparation of M-141 Sulfate

A solution of 100 mg. of M-141 hydrochloride in 2 ml. of water is added to a solution of 62 mg. of silver sulfate in 7 ml. of water. The precipitated silver chloride is removed and the supernatant is tested for chloride. After verifying the absence of chloride ions, the supernatant is treated with hydrogen sulfide gas to precipitate any excess silver. A stream of air is passed through the solution until the hydrogen sulfide is completely expelled. The solution is evaporated to dryness and the residue is dissolved in 0.8 ml. of water. After addition of 1 ml. of methanol and 2 ml. of acetone to the solution, the M-141 sulfate crystallizes in a few minutes. After recrystallizing from 50% aqueous methanol, the yield is 50 mg. of M-141 sulfate which analyzes: C = 33.37%; H = 6.88%; N = 5.67%; S = 6.35%; O = 47.04%. Calculated for $C_{14}H_{26}N_2O_7 \cdot H_2SO_4 \cdot 3.5\text{-}H_2O$: C = 33.93%; H = 7.12%; N = 5.65%; S = 6.47%; O = 46.82%. The sulfate decomposes above 190° C. and crystallizes in thin, flat, rectangular plates. In crossed polarized light, the crystals exhibit high birefringence with some interference colors and show sharp extinction parallel to the longest axis.

The X-ray diffraction pattern for crystalline M-141 sulfate was obtained on photographic film using nickel filtered CuK$\alpha$ radiation ($\lambda = 1.5418$ A) with a standard General Electric powder camera of 7.16 cm. radius which permitted detection of d-spacings up to 20 A. The relative intensities of the diffraction lines were estimated visually. The d-spacings and intensities are shown in the following table:

X-Ray Diffraction Pattern for M-141 sulfate

| d-spacing in Angstroms | Estimated Relative Intensity | d-spacing in Angstroms | Estimated Relative Intensity |
|---|---|---|---|
| 14.8 | 2 | 2.72 | 2 |
| 8.3 | 4 | 2.55 | 2 |
| 7.3 | 8 | 2.48 | 3 |
| 6.5 | 10 | 2.42 | 2 |
| 6.0 | 7 | 2.35 | 4 |
| 5.6 | 8 | 2.28 | 2 |
| 5.2 | 3 | 2.23 | 1 |
| 4.9 | 2 | 2.18 | 1 |
| 4.68 | 3 | 2.15 | 1 |
| 4.41 | 5 | 2.11 | 2 |
| 4.21 | 7 | 2.04 | 3 |
| 4.02 | 1 | 2.01 | 2 |
| 3.90 | 4 | 1.94 | 1 broad |
| 3.75 | 3 | 1.89 | 1 |
| 3.61 | 2 | 1.81 | 1 |
| 3.50 | 2 broad | 1.78 | 2 |
| 3.33 | 1 | 1.72 | 2 broad |
| 3.22 | 4 | 1.64 | 1 |
| 3.13 | 1 | 1.62 | 1 |
| 3.02 | 9 | 1.57 | 1 |
| 2.94 | 2 | 1.50 | 1 |
| 2.84 | 4 | 1.42 | 1 broad |

The assay of antimicrobial agent M-141 is performed by a modification of the technique of Loo et al published in the *Journal of Bacteriology*, Volume 50, pp. 701–709 (1945).

A stock solution of the crystalline M-141 hydrochloride is prepared at 10.0 mg./ml. and stored frozen or at 4° C. for daily use. The value assigned to the crystalline hydrochloride for assay purposes is 1,000 micrograms of activity per milligram.

The assay medium used is Difco Antibiotic Assay Medium No. 5 with 0.1% weight to volume of glucose added after sterilizing. The sterile agar medium is seeded with a convenient volume of a broth culture of *Escherichia coli* ATCC 26 and poured into standard 100 mm. flat bottom Petri dishes with 7.0 ml. seeded agar per dish. The inoculum of *Escherichia coli* is grown on a rotary shaker in tryptone, beef extract, 0.1% w/v glucose broth.

The crystalline hydrochloride aqueous stock solution is diluted in aqueous 5% potassium phosphate buffer at pH 8.5 at 400, 200, 100, 50 and 25 mcg./ml. The buffer is prepared by combining 5% w/v aqueous solutions of $K_2HPO_4$ and $KH_2PO_4$. The sensitivity of the assay is between 12.5 and 25 mcg./ml.

Materials to be assayed for potency are diluted to convenient theoretical dilutions in the same buffer used for the standard. Plates are incubated overnight at 32° C. and potencies of unknown solutions are calculated by standard methods.

The dose response shown by antimicrobial agent M-141 is a slightly curved line when plotted on semilogarithmic paper with the zone diameters as ordinates versus the log of the concentration as the abscissa.

In much of the early work with antimicrobial agent M-141 the inhibition zone versus *Escherichia coli* was the only assay available. The point of reference under these conditions was an inhibition zone produced by a known amount of chloramphenicol tested under the same conditions. Assays were reported merely as zone diameters.

As has already been pointed out, this invention relates to a novel antimicrobial agent which is obtained in the form of its acid-addition salts. The hypothetical free base, which has not been isolated has the empirical formula $C_{14}H_{26}N_2O_7$. The antimicrobial agent is produced by growing the organism *Streptomyces flavopersicus* sp. nov. in a submerged fermentation process on a nutrient medium containing assimilable sources of carbohydrate, nitrogen and inorganic salts until a substantial amount of the antimicrobial product is present in the medium and recovering the substance in the form of one of its acid-addition salts by ion exchange techniques which take advantage of its basicity.

The hydrochloride salt of antimicrobial agent M-141 crystallizes from water solution in colorless, transparent, long, narrow, sharp pointed crystals. In crossed polarized light the crystals show many interference colors, high birefringence and sharp parallel extinction.

In water solution, the hydrochloride is dextrorotatory, $\alpha_D^{25} = 25$. There is no characteristic absorption of ultraviolet light. Titration of an aqueous solution of the hydrochloride with sodium hydroxide solution reveals the presence of two titratable groups with pKa values of about 7.0 and 9.0 which become 5.0 and 7.5 in 4% formaldehyde solution. The molecular weight derived from the titration data is about 490. The hydrochloride salt which melts at 210° C. is very soluble in water, somewhat soluble in methanol, and insoluble in other common organic solvents such as acetone, chloroform, and ether.

After crystallization from water, the M-141 hydrochloride analyzes as follows: C = 34.03%; H = 7.46%; O = 38.83%; N = 5.56%; Cl = 14.19%; loss on drying = 19.1%; C-methyl = 4.76%; O-methyl = 0%. Calculated for $C_{14}H_{38}O_{12}N_2Cl_2$: C = 33.9%; H = 7.7%; N = 5.6%; Cl = 14.3%; O = 38.7%; loss on drying = 18.1%. The loss on drying agrees closely with the presence of 5 molecules of water of crystallization so the formula for M-141 base is $C_{14}H_{26}N_2O_7$. The X-ray diffraction pattern for crystalline M-141 hydrochloride was obtained as previously described for the sulfate. The d-spacings and intensities are shown in the following table:

| X-Ray Diffraction Pattern for M-141 Hydrochloride | | | |
|---|---|---|---|
| d-spacing in Angstroms | Estimated Relative Intensity | d-spacing in Angstroms | Estimated Relative Intensity |
| 11.5 | 3 | 2.78 | 4 |
| 9.2 | 5 | 2.66 | 4 |
| 7.9 | 2 | 2.60 | 2 |
| 7.1 | 6 | 2.54 | 2 |
| 6.6 | 8 | 2.45 | 3 |
| 6.1 | 9 | 2.36 | 2 |
| 5.8 | 1 | 2.31 | 2 broad |
| 5.2 | 1 | 2.28 | 2 broad |
| 4.64 | 9 | 2.23 | 1 |
| 4.36 | 4 | 2.18 | 4 broad |
| 4.10 | 2 | 2.12 | 1 |
| 3.85 | 6 broad | 2.06 | 2 |
| 3.71 | 1 | 1.99 | 2 |
| 3.61 | 1 | 1.91 | 1 |
| 3.50 | 3 | 1.87 | 1 |
| 3.40 | 1 | 1.84 | 2 |
| 3.30 | 10 | 1.77 | 1 broad |
| 3.16 | 1 | 1.74 | 1 |
| 3.09 | 4 | 1.70 | 1 |
| 2.95 | 4 | 1.65 | 1 |
| 2.87 | 3 | 1.56 | 1 |

Attempts to prepare the free base have thus far been unsuccessful because of the instability of the base at the high pH required to take the acid away from the basic function having a pKa of 9. However, it is not necessary to obtain the free base in order to convert the hydrochloride or sulfate into any desired salt. In the process of recovering the antimicrobial substance from the culture liquid a cation exchange resin may be employed. The antimicrobial substance may be eluted from the resin by the desired acid, and the product will then be the desired salt. However, it is advantageous to crystallize a salt of the antimicrobial base in order to free it from unwanted organic bases. The hydrochloride and sulfate salts are readily crystallized from aqueous acetone or from their supersaturated water solutions. It is therefore convenient to prepare the crystalline hydrochloride or sulfate and then to convert it to other desired salts by any convenient means. The use of an anion exchange resin charged with the desired acid is a general method for substituting one acid for another. Illustrative examples of salts which can be prepared in this manner are the formate, carbonate, oxalate, salicylate, citrate, benzoate and the like.

When an infrared spectrum of antimicrobial agent M-141 as the crystalline hydrochloride salt is run as a Nujol mull, using a double beam spectrophotometer, the following absorption bands are seen:

INFRARED SPECTRUM

| Wave Length in Microns | Frequency in Reciprocal Centimeters | Intensity |
|---|---|---|
| 2.9 – 3.4 | 3400 – 2940 | S (broad) |
| 3.45 | 2900 | Nujol |
| 5.95 – 6.15 | 1680 – 1625 | M (broad) |
| 6.36 | 1572 | M |
| 6.85 | 1460 | Nujol |
| 7.27 | 1376 | Nujol |
| 7.39 | 1353 | W |
| 7.51 | 1332 | W |
| 8.49 | 1177 | W |
| 8.73 | 1145 | M |
| 8.90 | 1124 | W |
| 9.01 | 1110 | M |
| 9.2 | 1087 | M |
| 9.29 | 1076 | M |
| 9.54 | 1048 | M |
| 9.63 | 1039 | M |
| 9.72 | 1029 | M |
| 9.97 | 1003 | M |
| 10.45 | 957 | M |
| 10.62 | 941 | W |
| 10.79 | 927 | S |
| 11.16 | 896 | W |
| 11.39 | 878 | W |
| 11.58 | 864 | S |
| 12.21 | 819 | W |
| 13.73 | 728 | M |
| 13.9 | 719 | Nujol |

S = Strong; M = Medium; W = Weak

Figure 1:
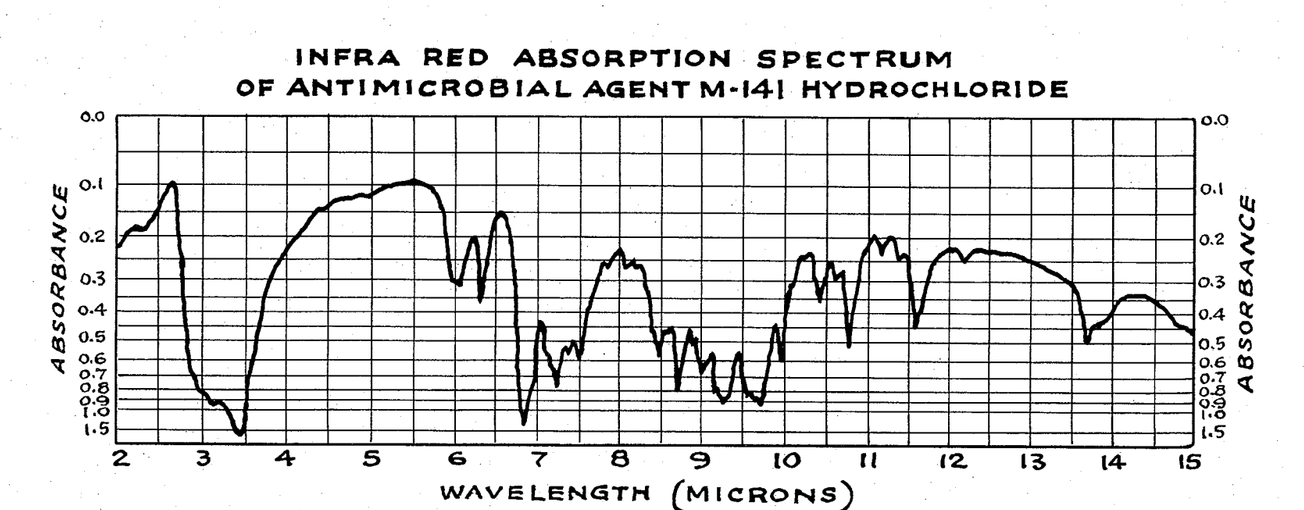

The complete infrared absorption spectrum of the crystalline hydrochloride of antimicrobial agent M-141 is shown in the accompanying drawing.

Paper Chromatography of Crystalline M-141 Hydrochloride

The following approximate Rf values were obtained by chromatographing 1.0 mcg. of the crystalline hydrochloride of M-141 by ascending technique at 28° C. Bioautographs were obtained using Difco antibiotic assay medium No. 5 seeded with spores of Bacillus subtilis ATCC 10707.

Solvent System 1 — n-butanol saturated with deionized water at 28° C.
  Equilibration with solvent vapors — 3 hours
  Irrigation or development — 16.5 hours
  Rf = 0.03
Solvent System 2 — Same as solvent 1 with addition of 2.0% w/v p-toluenesulfonic acid.
  Equilibration time — 3 hours
  Irrigation or development — 16.5 hours
  Rf = Principal zone 0.25 – 0.30; minor zone approximately 0.40; zone size reduced in comparison with solvent 1.
Solvent System 3 — Same as solvent 1 with addition of 2.0% w/v p-toluenesulfonic acid and 2.0% v/v piperidine.
  Equilibration — 3 hours
  Irrigation of developing time — 16.5 hours
  Rf value — approximately 0.45

The zone of inhibition from this system is markedly reduced over that produced from system 1 and significantly smaller than that produced in system 2.

The invention is not to be limited to the production of antimicrobial agent M-141 by the described species of Streptomyces. It is to be understood that the fermentative processes of this invention also embrace other antimicrobial agent M-141 producing strains of Streptomyces flavopersicus produced by exposure of the described organism to modifying means such as X-ray, ultraviolet light and chemical agents such as, for example, nitrogen mustards.

Antimicrobial agent M-141 in the form of its acid-addition salts are characterized by a broad antibacterial spectrum. The activity of said agent against illustrative organisms is shown in the following table:

ANTIMICROBIAL SPECTRUM

| Organism | Minimum Inhibitory Concentration After 48 Hours in mcg./ml. |
|---|---|
| Aerobacter aerogenes | >100 |
| Escherichia coli 6880 | 25 |
| Escherichia coli Juhl | 50 |
| Klebsiella pneumoniae | 25 |
| Neisseria catarrhalis | 12.5 |
| Salmonella enteritidis | 50 |
| Salmonella typhimurium | 100 |
| Shigella sonnei | 75 |
| Proteus vulgaris | 400 |
| Proteus mirabilis | 100 |
| Pseudomonas aeruginosa BMH No. 10 | 25 |
| Pseudomonas aeruginosa BMH No. 1 | >100 |
| Pseudomonas aeruginosa BMH No. 4 | >100 |
| Pseudomonas aeruginosa BMH No. 6 | >100 |
| Pseudomonas aeruginosa 10145 | >100 |
| Pasteurella multocida | 25 |
| Bacillus subtilis | 50 |
| Clostridium sporogenes | >400 |
| Corynebacterium species | 50 |
| Diplococcus pneumoniae | 50 |
| Lactobacillus casei | 25 |
| Sarcina lutea | 50 |
| Staphylococcus aureus 209P | 100 |
| Staphylococcus aureus Smith | 200 |
| Staphylococcus aureus Treaster | >100 |
| Staphylococcus aureus Wise 391 | >100 |
| Staphylococcus albus | 100 |
| Streptococcus faecalis | >100 |
| Streptococcus pyogenes | 50 |
| Candida albicans | >100 |
| Saccharomyces cerevisiae | >100 |
| Actinomyces bovis | 12.5 |
| Aspergillus niger | >100 |
| Chaetomium globosum | >100 |

Antimicrobial agent M-141 in the form of its acid-addition salts has a low order of toxicity and may be employed orally or intravenously. The toxicity of M-141 hydrochloride, for example, when employed intravenously has been found to have an $LD_{50}$ of approximately 1,000 mg./kg. Orally the toxicity of M-141 hydrochloride has been found to give an $LD_{50}$ of more than 5,000 mg./kg. Antimicrobial agent M-141 is extremely useful in controlling coccidiosis. In representative operations, it has been found that when antimicrobial agent M-141 hydrochloride is incorporated into the feed of chickens at a concentration of 0.9 gram to 1.8 grams per 1.5 kilograms of feed and fed to chickens heavily infested with coccidiosis due to the presence of the protozoan organism Eimeria tenella, excellent control of coccidiosis resulted.

What I claim is:

1. A method of producing antimicrobial agent M-141 which comprises cultivating the organism Streptomyces flavopersicus NRRL 2820 under submerged aerobic conditions in a culture medium containing assimilable sources of carbohydrate, organic nitrogen and inorganic salts until substantial antimicrobial activity is produced by said organism in said culture medium.

2. A method of producing antimicrobial agent M-141 which comprises cultivating the organism Streptomyces flavopersicus NRRL 2820 under submerged aerobic conditions in a culture medium containing assimilable sources of carbohydrate, organic nitrogen and inorganic salts until substantial antimicrobial activity is produced by said organism in said culture medium and recovering the antimicrobial agent M-141 from said culture medium.

3. A method as claimed in claim 2 which includes the steps of clarifying the culture medium, adsorbing the antimicrobial agent M-141 from the clarified culture medium with a solid absorbent and eluting the adsorbate.

4. A method as claimed in claim 2 in which the culture medium is maintained at a temperature between about 24° C. and about 32° C. and the growth of the organism is carried out for a period of from 1 to 5 days.

* * * * *

UNITED STATES PATENT OFFICE
CERTIFICATE OF CORRECTION

Patent No. 3,859,170               Dated January 7, 1975

Inventor(s) Alma W. Goldstein

It is certified that error appears in the above-identified patent and that said Letters Patent are hereby corrected as shown below:

In Column 17, line 15 under "Eluate No." please delete the "5" in "1 - 5" and substitute "2".

Signed and sealed this 29th day of April 1975.

(SEAL)
Attest:

RUTH C. MASON
Attesting Officer

C. MARSHALL DANN
Commissioner of Patents
and Trademarks